United States Patent

[11] 3,601,856

| [72] | Inventors | Joseph R. Harris, Jr.<br>Canton;<br>Walter A. Hartz, Cuyahoga Falls; Paul L.<br>Rossomme, Uniontown, all of, Ohio |
|---|---|---|
| [21] | Appl. No. | 847,650 |
| [22] | Filed | Aug. 5, 1969 |
| [45] | Patented | Aug. 31, 1971 |
| [73] | Assignee | The General Tire & Rubber Company |

[54] PRESSURE SEAL FOR COMPRESSION MOLDING
15 Claims, 6 Drawing Figs.

[52] U.S. Cl..................................................... 18/42 R, 18/19
[51] Int. Cl....................................................... B29c 1/00
[50] Field of Search............................................18/19 F, 36, 42 D, 42 R, 42 J

[56] References Cited
UNITED STATES PATENTS

| 2,633,603 | 4/1953 | Huse | 18/42 R |
| 2,955,323 | 10/1960 | Rivenes | 18/42 R |
| 3,130,451 | 4/1964 | Morse | 18/19 F |
| 3,238,566 | 3/1966 | Koehler | 18/19 F |
| 3,330,002 | 7/1967 | Shelby | 18/19 F |
| 3,458,903 | 8/1969 | Shelby | 18/19 F |

FOREIGN PATENTS

| 550,507 | 1/1943 | Great Britain | 18/42 R |
| 1,077,375 | 4/1954 | France | 18/42 R |

*Primary Examiner*—J. Howard Flint, Jr.
*Attorneys*—Frank C. Rote, Jr., John J. Murphey and Denbigh S. Matthews ABSTRACT: This invention concerns a pressure seal mounted around a mold cavity formed by two mold members to prevent the exudation of molding compound from the cavity during the mold-closing and holding steps in the molding cycle and comprises a strip of material surrounding the mold cavity mounted along one edge thereof to the first mold member, the strip having a sealing portion adapted to engage a receiving surface on the second mold member and including a spring-loaded portion, to provide initial force for the sealing portion to form a tight seal during the initial part of the mold-closing step in the molding cycle, and a rigid-deflectable portion to provide secondary force for the sealing portion, upon final mold closure, and means for mounting the strip to one of the mold members.

INVENTORS
JOSEPH R. HARRIS, JR.
WALTER A. HARTZ &
BY PAUL L. ROSSOMME

ATTORNEY

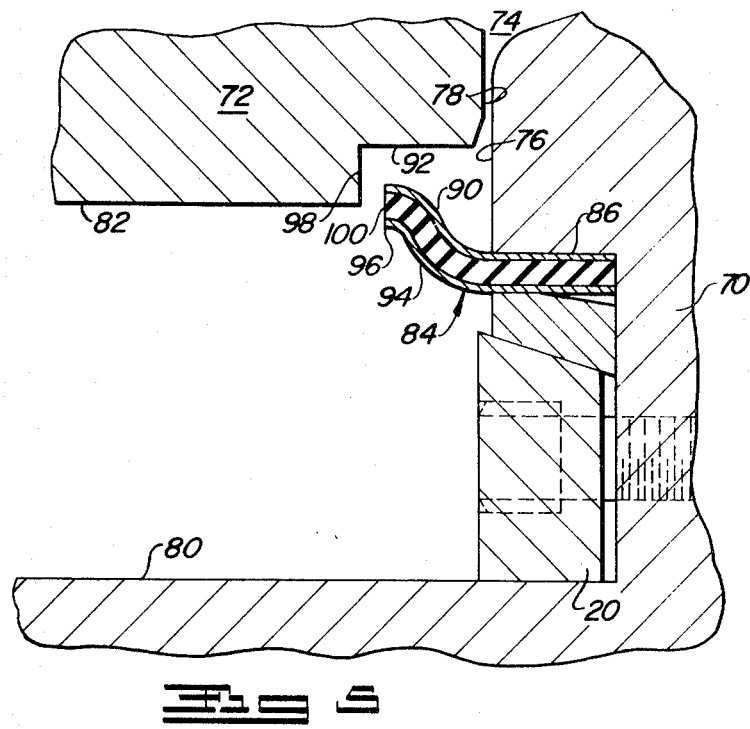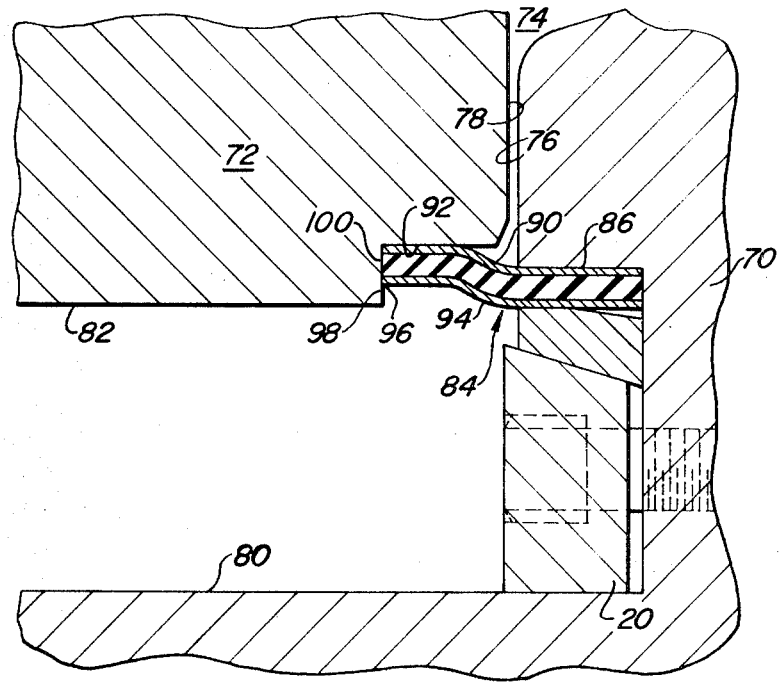

PRESSURE SEAL FOR COMPRESSION MOLDING

BACKGROUND OF THE INVENTION

1. Field of the Invention

This invention relates to the field of compression molding of plastics. More particularly, this invention relates to sealing of the compression mold members during the molding cycle to raise the pressure in the mold cavity and thereby reduce defects in the plastic parts molded therein.

2. Description of the Prior Art

Plastics continue to replace metals as a material of construction. The cost savings of plastics over metals combined with the ease of manufacturing and weight savings of plastics provides continued impetus for plastic's invasion into the metal field. A most notable example of this situation is in the automotive industry wherein each year plastics replace more and more metal automobile parts.

Plastics can be fabricated into enumerable geometrics possessing wide ranges of strength; obviously, the more intricate the design and higher the required strength the more difficult the manufacturing technique. Plastics may now be fabricated into such designs and strengths as to replace external, semistructural metal members such as automobile fender extensions. In these, strength requirements necessitate the use of strong fiber-reinforced thermosetting plastics.

Among the strongest and most widely used fiber-reinforced thermosetting plastic is glass fiber-reinforced polyester plastic. Polyesters, esterification products of organic polycarboxylic acids and glycols, are compounded with cross-linking monomers such as styrene, catalysts such as peroxides, pigments such as titanium dioxide, fillers such as calcium carbonate, lubricants, inhibitors, etc. and impregnated into a mass of fibers—usually staple glass fibers. This doughy mixture is utilized in a variety of molding processes wherein heat is applied to cross-link the polyester resin into an extremely tough, durable product. Other fiber-reinforced and nonfiber-reinforced thermosetting plastics are used in these areas where applicable. Examples of these other types of plastics are urea-formaldehyde and phenolformaldehyde resins.

Of the conventional methods of making plastic parts, including semistructural plastic parts, automatic and semiautomatic molding techniques have proven most popular because of their inherently high production rates, lower manpower costs, and improved product uniformity. Fiber reinforcement of the plastic, however, generally interferes with automatic molding techniques. One of the more popular semiautomatic molding processes, from the standpoint of incorporation of fiber reinforcement and the general subject of this invention is the method known as compression molding.

A compression molding cycle generally comprises forming a mold charge from a compound of polyester resin, cross-linking monomers, associated activators, fillers, staple fibers, etc.; placing this charge on one of a pair of cooperating mold members, supported to be moved toward and away from each other in controlled alignment; closing and holding closed the mold members while applying heat thereto, to cross-link (cure) the polyester; then separating the mold members and ejecting the final part. During closing of the mold members, the mold charge flows under pressure to fill the mold cavity. Simultaneously, smooth, aligned surfaces about the perimeter of the male and female mold members slide together and effect a "pinch-off" around the perimeter of the mold to stop the major flow of molding compound from the mold cavity. The heat applied during the mold-holding step activates the catalyst in the compound and promotes cross-linking of the polyester.

The prior art has experienced some problems in compression molding parts where the surface of the finished part may be subsequently painted and used for decorative purposes. One such problem is the appearance of small pinholes and crazes on the molded surface that become highlighted by subsequent painting. Repairing these pinholes is many times impractical because of the expense of filling with a repair compound.

Attempts to eliminate these surface defects have been many and varied. Polymerization inhibitors have been added to the molding compound to prevent precuring of the material during the time it flows to fill the mold. This corrective action not only increases material costs but increases mold-holding time and reduces overall output rates. Another attempt has been to break the molding compound into a number of small pieces and place these pieces in different locations in the mold. This method increases mold loading times. Another method, one in wide spread use, is to "veil" the molding compound prior to mold loading. By "veiling" is meant to wrap the uncured molding compound in a layer (veil) of fibers or place a layer of fibers in the mold prior to or after loading the mold charge. Subsequent compound flow through the pinch-off during mold closure will be inhibited by the veil. Although to an extend this method has solved some of the surface defect problem, it is an obvious increase in material usage and overall manufacturing costs. Moreover, as the glass fibers are pinched by the mold pinch-off surfaces, during the mold-closing step, they erode these pinch-off surfaces. Changing the molding compound formula, such as by using a catalyst with a lower activation temperature, has also been tried with varied success.

The invention is the discovery of an improved pressure seal over the seal disclosed in U.S. Pat. Application, Ser. No. 801,599, titled "Seal Device for Compression Molding.". This inventive seal has a longer life than the flexible seal of Ser. No. 801,599 and performs the very same functions with the added feature of forming a tight seal between the mold members at an earlier stage in the mold-closing step in the molding cycle.

The preferred embodiment of this invention, hereinafter set forth, is to provide a seal around the perimeter of one of the mold members, adapted to from a pressuretight seal with the other mold member during the initial part of the mold-closing step in the molding cycle. Compound exudation from the mold is thereby prevented and a positive pressure created within the mold cavity resulting in the elimination of surface pinholes and other defects in the molded product.

Therefore, the main object of this invention is a pressure seal for use in compression molding to prevent the exudation of molding compound from the mold cavity during the mold-closing step in the molding cycle to eliminate surface defects in the molded products. Further objects of this invention include a pressure seal that eliminates most of the requirement for close tolerance machining of the pinch-off surfaces and surrounding surfaces of the mold; that is relatively east to install and maintain; that has a long, useful life; and that increases compression mold life. Further objects of this invention will become apparent upon reading the preferred embodiments and accompanying drawings hereinafter set forth.

SUMMARY OF THE INVENTION

This invention concerns a pressure seal for a mold cavity formed by first and second mold members, comprising a strip of material surrounding the mold cavity and having one edge thereof mounted to the first mold member, the strip having a sealing portion adapted to engage a receiving surface on the second mold member and including a spring-loaded portion, to provide initial force for the sealing portion to form a tight seal during the initial part of the mold-closing step in the molding cycle, and a rigid-deflectable portion to provide secondary support for the sealing portion, upon final mold closure, and means for mounting the strip to the first mold member.

BRIEF DESCRIPTION OF THE DRAWINGS

FIG. 5 is a cross-sectional view of a portion of a pair of compression mold members in the mold-open position and showing still another embodiment of this invention.

FIG. 6 is the same view as in FIG. 5 but in the mold-closed position.

DESCRIPTION OF THE PREFERRED EMBODIMENTS

In general, this invention applies to a mold cavity, formed by two mold members, and comprises a strip of material surrounding the mold cavity, one edge of the strip being mounted on one of the mold members, the strip containing a sealing portion adapted to engage a receiving surface on the other mold member and including a spring loaded portion to provide initial force for the sealing portion, to form a tight seal during the initial part of the mold-closing step in the molding cycle, and including a rigid-deflectable portion to provide secondary force for the sealing portion upon final mold closure and means for mounting the strip on one of the mold members.

As shown in the figures and as fully disclosed herein, the seal may be modified within the teachings of this invention to include strips of different materials, depending upon the design of the seal, and different initial and secondary support configurations.

In the mold-closing step in the molding cycle, the mold members travel from full open to full closed. The novel seal of this invention operates during the latter part of the mold closing step, that is, where the mold members are just starting to approach final closure, and upon final closure. To differentiate between these two stages of mold member travel, the phrase "during the initial part of the mold-closing step" will be used herein to indicate the position of the members as they approach final closure, and the phrase "final mold closure" will be used herein to denote the final closed position of the mold members.

Figure 1:
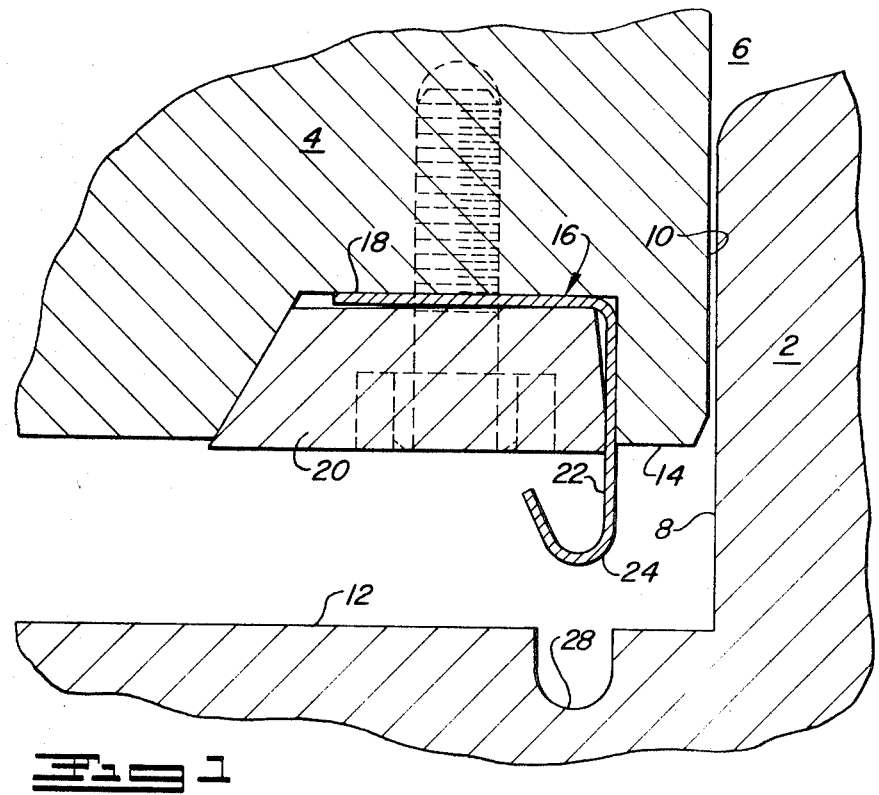
FIG. 1 is a cross sectional view of a portion of a pair of compression mold members in the mold-open position and showing one embodiment of this invention.
Figure 2:
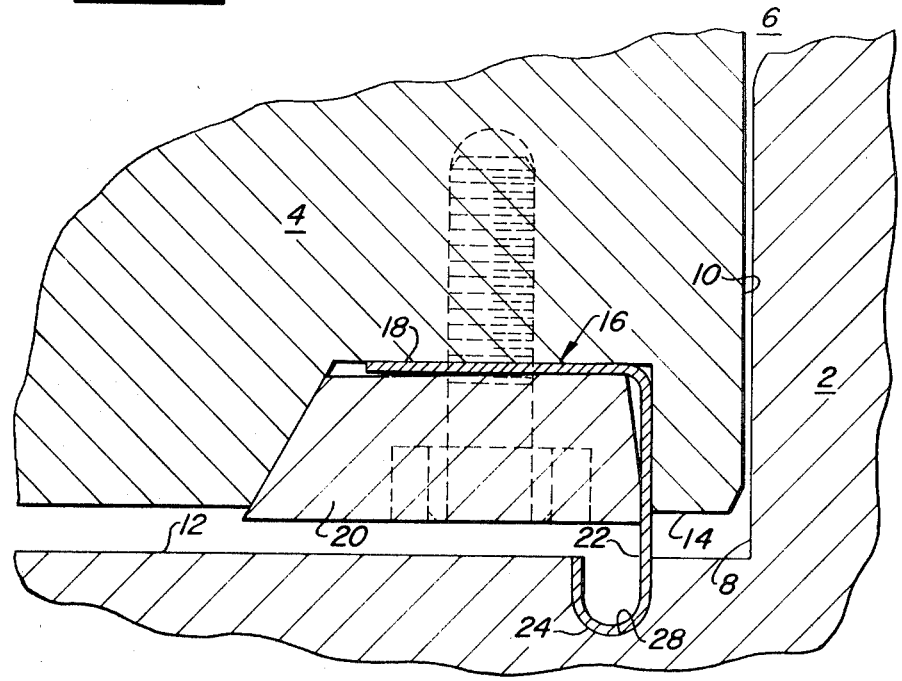
FIG. 2 is the same view as in FIG. 1 but in the mold-closed position.

In FIGS. 1 and 2 are shown a portion of a pair of compression mold members, in the mold-open and mold-closed positions respectively, adapted to be moved toward and away from each other in controlled alignment and include mold member 2, mold member 4, and mold cavity 6 defined thereby. Surrounding mold cavity 6 are the pinch-off surfaces of the mold members, shown here as vertical edges 8 and 10 respectively of mold members 2 and 4. Extending outward from vertical edges 8 and 10 are horizontal mold edges 12 and 14.

In prior art practice, vertical edges 8 and 10 were machined to close tolerances and slid together during the mold-closing step of the molding cycle to theoretically form a seal and prevent escape or exudation of molding compound from the high pressure environment of the mold cavity. In reality, large gaps existed in vertical edges 8 and 10 due to machine finish limitations, mold wear, and mold distortion caused by heat warpage and press wear. Through these gaps exuded bulk molding compound during the mold-closing and mold-holding steps of the molding cycle causing loss of pressure in the mold cavity and defects in the parts molded therein.

The embodiment of the pressure seal of this invention, shown in FIGS. 1 and 2, comprises a strip of material surrounding mold cavity 6 and shown generally as strip 16. Strip 16 is mounted on horizontal edge 14 of mold member 4 at strip edge 18 by mounting means 20. Rigid-deflectable portion 22 extends substantially vertically (shown here as downward) from horizontal edge 14 and connects strip edge 18 to curved sealing portion 24. As shown here, curved sealing portion 24 is in the shape of an incomplete reverse curve wherein the tail or end of the curve is not fully reversed or completed to its full 180°. Positioned opposite curved sealing portion 24, in mold member 2, is receiving surface 28. As shown here, receiving surface 28 comprises a smooth-surfaced round-bottom groove running along the entire length of strip 16 and has a width substantially equal to the curvature of curved sealing portion 24 and a depth at least equal to the radius of curvature of curved sealing portion 24.

As mold member 4 is advanced toward mole member 2, during the initial part of the mold-closing step in the molding cycle, curved sealing portion 24 resiliently engages the edges of receiving surface 28 and forms a tight seal therewith. As mold member 4 is further advanced toward mold member 2, the curve of curved sealing portion 24 is forced to squeeze tighter or more completely as seal portion 24 enters receiving surface (groove) 28—all the while maintaining a tight seal against receiving surface 28. Upon complete mold closure, curved seal portion 24 bottoms on receiving surface 28 and rigid-deflectable portion 22 goes into compression and deflects or buckles slightly to provide secondary or additional force for seal portion 24 thereby forming a pressuretight seal. Under normal circumstances, further advance of mold member 4 would be prevented by mold stop pins or blocks (not shown) that are adjusted to control the distance between mold members upon complete mold closure. Such is not always the case, however, in the practice of this invention. In this invention the stop pins or blocks are used as a secondary means of stopping the advance of mold member 4 while the primary means is a combination of the amount of mold charge and the maximum clamping pressure of the mold press. It is desired, therefore, to adjust the amount of mold charge such that, at maximum mold pressure, the mold members are 10 to 15 mils (thousands of an inch) off the mold stops. This will result in a slightly thicker molded part which is generally considered a benefit rather than a disadvantage. The mold stop pins are still kept in the mold as a secondary means of stopping mold closure in the event the mold charge is under size. By this method the mold charge is subjected to maximum pressure which insures maximum cavity filling, collapses air bubbles, and produces a part with a much better finish. Therefore, the term "final mold closure" is to be taken to mean mold closure "off stops" as intended by this invention. Upon mold opening, curved sealing portion 24 is withdrawn from receiving surface 28 and the springiness of strip 16 forces the initial curvature of curved sealing portion 24 to recover.

Strip 16 may be a thin sheet or foil of any spring-type material that is stable at the temperatures encountered (generally 175°–350°F.) and compatible with the molding compound (generally thermosetting plastic compounds). Preferred for their abrasion resistance are foils of spring-type metals such as ferrous and nonferrous metal alloys; ferrous metal alloys are further preferred because of their long life and high strength and include high carbon steels in the AISI range of 1035 to 1095 : AISI 1095 spring-steel is especially preferred for its durability in high-temperature environments.

Curved sealing portion 24 may be of many different configurations in addition to the one shown in FIG. 1, such as a scroll curve, a hook ending in a reverse curve, etc. and may include more than one curve. In cases where the pressure in mold cavity 6 is unduly high, it may become desirable to increase the number or size of the curves to increase the seal contact area. When curved sealing portion 24 includes more than one curve, a corresponding change should be made in receiving surface 28 to conform the surface thereof into general agreement with the completed configuration of the curves.

Rigid-deflectable portion 22, between strip edge 18 and curved sealing portion 24 may be in virtually any direction between horizontal mold edges 12 and 14 except, of course, horizontal. It is preferred, however, to keep portion 22 near perpendicular to edges 12 and 14 for practical reasons, i.e., the strongest support for the thinnest cross section of portion 22, which incidently, is substantially parallel to mold member travel. The support force from rigid-deflectable portion 22 operates as in the case of column, i.e., the support comes from the compression stress imposed at the top and bottom of the horizontal axis through the support.

Receiving surface 28 should generally conform to the curvature of curved sealing portion 24 so that a seal is maintained on receiving surface 28 by spring force during the initial part of the mold-closing step in the molding cycle. Such a seal is necessary both to prevent initial surges of mold compound from the mold cavity (during mold closure) and to aid in maintaining a pressuretight seal during the mold-holding step in the molding cycle. In addition, the depth of receiving surface 28 should be at least equal to the radius of curvature of curved sealing portion 24 to allow a good seat for the seal and to give a usable seal contact area. Greater depths than this are possible and favorably increase the seal contact area. Furthermore, the sides of receiving surface 28 should be adapted to receive curved sealing portion 24 so that a large seal contact area is maintained for good sealing. The sides of the groove in receiving surface 28 are shown to be vertical as this allows easy entrance and withdrawal of curved sealing portion 24, however, the sides may be slanted or have some other configuration and still be within the teachings of this invention.

A meritorious feature of this novel pressure seal is that close tolerance machining of the edges and pinch-off surfaces of the mold members is almost totally eliminated. The only close tolerance required in this seal is in receiving surface 28 which, because of its location on a horizontal edge of a mold member, presents few problems in accomplishing. Another meritorious feature of this seal is its ability to function successfully under dirty conditions such as when particles of molding compound fall onto receiving surface 28 when the mold is opened and the molded part ejected. This is possible because of the wide contact area of the resilient seal and the dual seal support system, i.e., the initial spring contact and the secondary compression support.

Mounting means 20, shown in FIGS. 1 through 6, is a conventional fastening means and does not form a novel part of this invention. Other mounting means may be used such as bolting, using spring fasteners, welding, etc.

Curved seal portion 24 is shown in FIGS. 1 and 2 as defining a single incomplete reverse curve beginning near the inner edge of the mold cavity and extend outward, away from the mold cavity. This is s preferred embodiment because it permits the seal to be placed very close to the extremities of mold cavity 6 thereby reducing loss or flash space adjacent mold edges 8 and 10. However, the seal may be turned around so that the incomplete reverse curve begins away from mold cavity 6 and extends inward, toward mold cavity 6; such a configuration is contemplated in this invention.

Additionally, the whole seal embodiment, shown in FIGS. 1 and 2, may be inverted so that strip 16 is mounted on mold member 2 and receiving surface 28 is positioned on mold member 4. In this configuration the operation of the seal is identical to that already described and such a configuration is fully contemplated in this invention.

Figure 3:
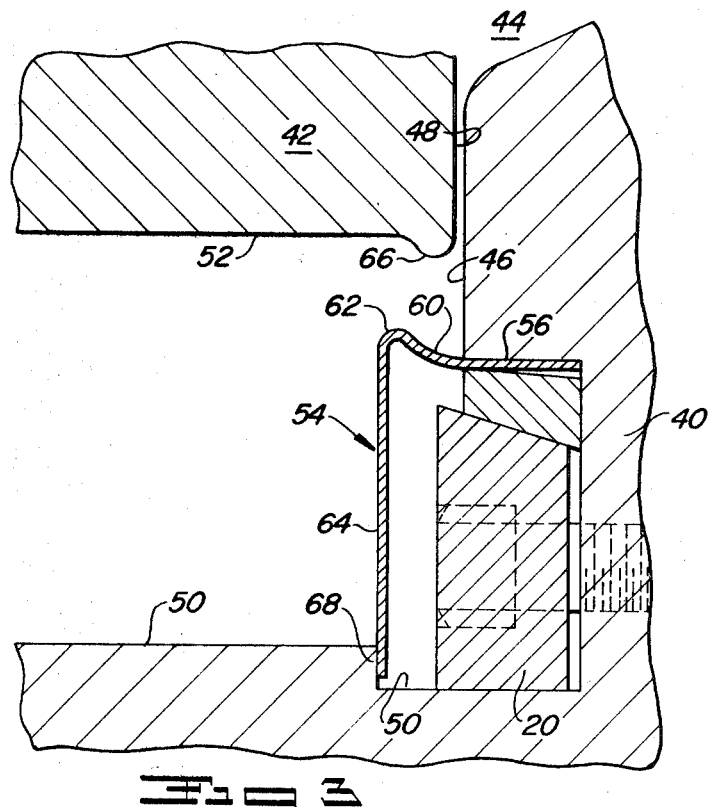
FIG. 3 is cross-sectional view of a portion of a pair of compression mold members in the mold-open position and showing another embodiment of this invention.
Figure 4:
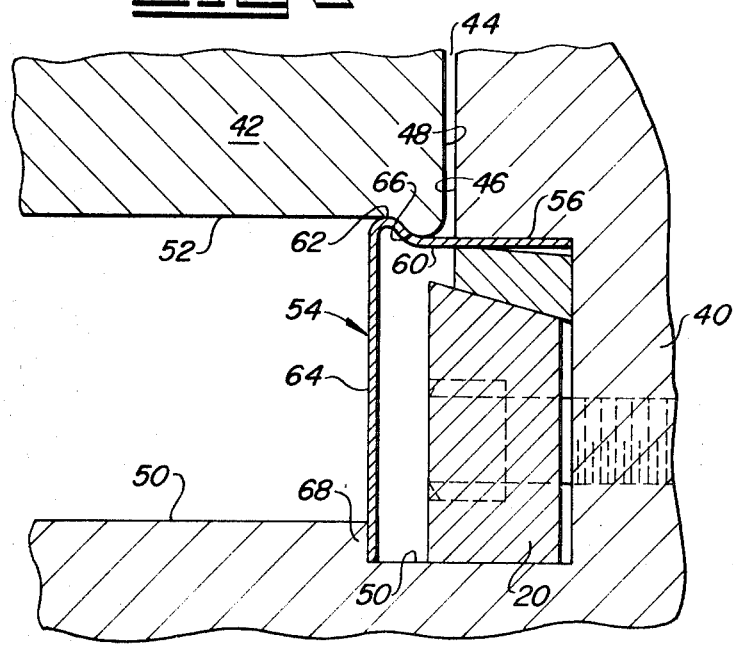
FIG. 4 is the same view as in FIG. 3 but in the mold-closed position.

In FIGS. 3 and 4 are shown a portion of a pair of compression mold members, in the mold-open and mold-closed positions respectively, similar to that shown in FIGS. 1 and 2 and include mold member 40, mold member 42, and mold cavity 44 defined thereby. Surrounding mold cavity 44 are the pinch-off surfaces of the mold members, shown here as vertical edges 46 and 48 respectively of the mold members 40 and 42. Extending outward from vertical edges 46 and 48 are horizontal mold edges 50 and 52.

The embodiment of the pressure seal of this invention, shown in FIGS. 3 and 4, comprises a strip of material surrounding mold cavity 44 and is shown generally as strip 54. Strip 54 is mounted on vertical edge 46 of mold member 40 at strip edge 56 by mounting means 20. Strip sealing portion 60 extends outward from strip edge 56 and is adapted to engage receiving surface 66 on mold member 42. Strip sealing portion 60 includes curved portion 62 that provides initial force for sealing portion 60 to form a tight seal against receiving surface 66 during the initial part of the mold-closing step in the molding cycle. Curved portion 62 is shown as a double-reversed curve wherein the curve adjacent strip edge 56 is concave in the direction of mold member 40. Extending substantially vertical from curved portion 62, away from strip edge portion 56 and toward mold member 40, is rigid-deflectable portion 64, that slideably engages stop 68 on horizontal edge 50 of mold member 40. Rigid-deflectable portion 64 is restrained from lateral movement away from the stop by preimpressed reverse spring tension applied to it by curved portion 62. Positioned opposite rigid sealing portion 60, on mold member 42, is receiving surface 66. As shown here, receiving surface 66 comprises a smooth-surface including an outwardly protruding lip having a curvature substantially equal to at least part of curved portion 62.

As mold member 42 is advanced toward mold member 40, during the initial part of the mold-closing step in the molding cycle, receiving surface 66 engages curved portion 62 of sealing portion 60 and forms a tight seal therewith. As mold member 42 is further advanced toward mold member 40, rigid-deflectable portion 64 slides toward and bottoms on horizontal edge 50 of mold member 40 and causes column deflection of buckling of support portion 64 and provides secondary sealing force for seal portion 60, thereby forming a pressure tight seal. Further advance of mold member 42 is prevented by the combination of amount of mold charge and maximum clamping pressure as described earlier with the stop pins or blocks (not shown) as a secondary stop means. Upon mold opening, receiving surface 66 is lifted from seal portion 60 and the springiness of strip 54 urges rigid-deflectable portion 64 off of horizontal edge 50 of mold member 40 and back into a resilient position.

Strip 54 may be a thin sheet of foil of any of the spring-type materials disclosed earlier in relation to the embodiment shown in FIG. 1 and 2 and, in addition, may include foils of hard, polymeric materials whose "memories" take the place of the springiness of metals such as cured polyester resins and polyetrafluoroethylene.

Curved portion 62 may be of many different configurations in addition to the one shown in FIG. 3 and may include more than one curve. As described above, where additional seal contact area is needed to offset higher mold cavity pressures, additional curvature on curved portion 62 may be desirable. In such cases, receiving surface 66 may be changed to conform generally to the additional curves.

Rigid-deflectable portion 64, extending from curved portion 62, away from strip edge portion 56 and toward mold member 40 may be in virtually any direction between horizontal mold edges 50 and 52 except, of course, horizontal. It is preferred, however, to keep portion 64 near perpendicular to edges 50 and 52 for practical reasons, i.e., the strongest support for the thinnest cross section of portion 64 which, incidently, is substantially parallel to mold member travel. Rigid-deflectable portion 64 provides the same column-type support as described earlier for the support portion of the embodiment shown in FIGS. 1 and 2.

Receiving surface 66 should be smooth and may generally conform to the curvature of curved portion 62 to that a seal contact area is maintained on receiving surface 66 during the initial part of the mold-closing step in the molding cycle. The necessity of maintaining the seal throughout this period is explained earlier in relation to the embodiment shown in FIGS. 1 and 2.

As shown in FIGS. 3 and 4, stop 68, upon which rigid-deflectable portion 64 presses in sliding engagement, comprises a raised step in mold member 40 extending outward from the intersection of the vertical plane of portion 64 and horizontal edge 50 of mold member 40. This step may be positioned in the opposite direction, i.e., extending toward the mold; this would require the preimposed reverse spring tension to be applied in the reverse direction. In addition, other stops may be provided such as bolt heads, welded blocks, etc.; all these configurations are contemplated in this invention.

Additionally, the whole seal embodiment, shown in FIGS. 3 and 4, may be inverted so that strip 54 is mounted on mold member 42 and receiving surface 66 is positioned on mold member 40. In this configuration, the operation of the seal is identical to that already described and such a configuration is fully contemplated in this invention.

In FIGS. 5 and 6 are shown a portion of a pair of compression mold members, in the mold-open and mold-closed positions respectively, similar to that shown in FIGS. 1 to 4 and include mold member 70, mold member 72, and mold cavity 74 defined thereby. Surrounding mold cavity 74 are the pinch-off surfaces of the mold members, shown here as vertical edges 76 and 78 respectively of mold members 70 and 72. Extending outward from vertical edges 76 and 78 are horizontal mold edges 80 and 82.

The embodiment of the pressure seal of this invention, shown in FIGS. 5 and 6, is a strip of material comprising a flexible, spring-type laminate having at least one layer of flexible polymeric material interposed and bonded to two flexible, cover layers of higher modulus material wherein the strip surrounds mold cavity 74 and is shown generally as strip 84. By "higher modulus" material is meant a material having a higher stress at equivalent strain than the flexible polymeric material making up the center layer. Strip 84 is mounted on vertical edge 76 of mold member 70 at strip edge 86 by mounting means 20. Strip sealing portion 90 extends outward from strip edge 86 and toward receiving surface 92 on mold member 72. Strip sealing portion 90 includes curved portion 94 that provides initial force for sealing portion 90 during the initial part of the mold-closing step in the molding cycle. Curved portion 94 is shown as an "offset" type of curve that extends outward from vertical edge 76 of mold member 70, then toward mold member 72 and then outward again from mold member 70. The term "offset" is used to indicate that the curve is not a pure double-reverse curve but more like a line that has been pulled or offset wherein the major axes of the ends of the curve are separated and substantially parallel, i.e., skewed within say 10° to 15°. Extending outward from curved portion 94, away from mold member 70, is rigid-deflectable portion 96. Portion 96 is held in position by the internal forces of strip 84 as will be described more fully later. Portion 96 terminates at strip edge 100. Strip edge 100 is shown as comprising a substantially flat face wherein the plane of the flat face is substantially parallel to stop 98 on mold member 72.

Positioned opposite sealing portion 90, on mold member 72, is receiving surface 92. As shown here, receiving surface 92 comprises a flat, smooth surface.

As mold member 72 is advanced toward mold member 70, during the initial part of the mold-closing step in the molding cycle, receiving surface 92 engages curved portion 94 of strip sealing portion 90 and forms a tight seal therewith. As mold member 72 is further advanced toward mold member 70, curve portion 90 is flattened by receiving surface 92 which forces rigid sealing portion 90, including strip edge 100 against stop 98 on mold member 72. At this point, the higher modulus cover layers of strip 84 are placed under compressive stress so as to tend to decrease (or narrow) the distance between the edges, of strip 84 and the interposed layer of flexible polymeric material is placed under slight shearing stress such as occurs in the buckling of an I-beam. The combination of the high modulus of the cover layers of strip 84 and the bond strength between the cover layers and the interposed layer of polymeric material wedges strip 84 firmly between stop 98 and vertical mold edge 76 to provide a pressure tight seal upon final mold closure.

Further advance of mold member 72 is prevented by means described earlier in relation to the embodiments shown in FIGS. 1 to 4. Upon mold opening, receiving surface 92 is lifted from seal portion 90 and the springiness of strip 84 forces it back into a resilient position.

Strip 84 may comprise a flexible, spring-type laminate having more having more than one layer of flexible polymeric material interposed and bonded to flexible, higher modulus layers and such a modification is fully contemplated herein. The requirements of the strip are: (1) that the layer of polymeric material be flexible and resist internal disintegration; (2) that the cover layers be flexible and of a higher modulus material as disclosed earlier; (3) that a firm bond be maintained between the layers, and; (4) that the strip contain sufficient springiness to return to its original position for mold opening. Examples of flexible polymeric materials for use as the center layer include styrene-acrylonitrile rubber, SBR rubber, EPDM rubber, and plasticized polyvinyl chloride. Examples of flexible, high modulus materials for use as the cover layers include ferrous and nonferrous metal and alloys thereof, such as high carbon steel, aluminum, and brass, and tough, hard polymeric materials such as sheets of fiber-reinforced polyester.

The spring type nature of the strip may be provided by an element of the laminate, by the method of manufacturing the laminate, or by a combination thereof. A layer or layers of spring-type materials may be incorporated in the laminate either as a cover layer or buried in the layer of flexible polymeric material. These materials have been disclosed and exemplified in relation to the embodiment shown in FIGS. 1 and 2. Also, the layers comprising the laminate may be separately cut, bent, stacked together, and then bonded to provide a "preshaped" laminate that will return to its original shape after flexing by action of internal forces in the laminate seeking to relieve the stresses created during the flexing this is somewhat similar to the "memory" phenomenon in certain plastics. Obviously, a combination of these two methods will provide the required springiness in strip 84.

Curved portion 94 may be of many configurations and may include more than one curve. The "offset" type of curve shown in FIG. 5 appears to provide adequate operation for support portion 90 with a minimum of curvature.

As shown in FIGS. 5 and 6, stop 98, upon which strip edge 100 presses, comprises a raised step in mold member 72 extending outward from mold cavity 74. Other stops are contemplated such as bolt heads, welded blocks, etc. The surface of stop 98 should be substantially parallel to strip edge 100. Although a few degrees of slant in either direction may be tolerated, too much slant will adversely affect the cooperation of the cover layers of strip 84 and permit buckling of strip 84 or fail to hold strip 84 tightly enough to provide a proper seal.

Although strip edge 100 may be in virtually any inclination, except horizontal, as described before in similar circumstances with rigid-deflectable portion 22 in FIGS. 1 and 2 and rigid-deflectable portion 64 in FIGS. 3 and 4, it is preferred to keep strip edge 100 perpendicular to horizontal mold edges 80 and 82 which, incidently, is substantially parallel to the axis of mold member travel. Strip edge 100 should also be kept substantially flat to provide the best sealing face.

Rigid-deflectable portion 96 shown as a short segment of strip 84. The length of support portion 96 may be varied to suit the particular requirements of the mold such as where stop 98 is situated further from vertical edge 78; in such a situation, portion 96 must be lengthened to make up this increased distance.

Receiving surface 92 should be smooth and flat, although a small amount of curvature may be desired, so that a wide seal contact area is maintained during the initial part of the mold-closing step in the molding cycle. The necessity of maintaining the seal throughout this period is explained earlier in relation to the embodiments shown in FIGS. 1 to 4.

Additionally, the whole seal embodiment, shown in FIGS. 5 and 6, may be inverted so that strip 84 is mounted on mold member 72 and receiving surface 92 is positioned on mold member 70. In this configuration the operation of the seal is identical to that already described and such a configuration is fully contemplated in this invention.

We claim:

1. A pressure seal for a compression mold cavity formed by first and second mold members arranged to move toward and away from each other in controlled alignment comprising:
   a. a relatively thin strip of spring-type material surrounding said mold cavity having one edge thereof mounted on said first mold member, said strip curving away from said mounted edge and forming a sealing portion for engagement with a receiving surface on said second mold member, and including a spring-loaded portion to urge said sealing portion into sealing contact with said receiving surface during the initial part of the mold-closing step in the molding cycle, and a rigid-deflectable portion to provide secondary force for said seal upon final mold closure;

b. a recessed receiving surface on said second mold member adapted to receive said sealing portion of said strip; and, c. means for mounting said edge of said strip to said first mold member.

2. A pressure seal, as described in claim 1, wherein:

a. said strip of material consists of a thin foil of spring-type metal;

b. said edge portion is mounted along the horizontal edge of said first mold member; and, c. said rigid-deflectable portion is located between said edge portion and said sealing portion and extends substantially perpendicularly from said horizontal edge of said first mold member.

3. A pressure seal for a compression mold cavity formed by first and second mold members arranged to move toward and away from each other in controlled alignment comprising:

a. a relatively thin strip of spring-type material surrounding said mold cavity having one edge thereof mounted along a vertical edge of said first mold member, said strip curving away from said mounted edge and forming a sealing portion for engagement with a receiving surface on said second mold member, and including a spring-loaded portion to urge said sealing portion into sealing contact with said receiving surface during the initial part of the mold closing step in the molding cycle, and a rigid, deflectable portion extending from said sealing portion and away from said mounted edge portion for engagement with said second mold member to provide secondary force for said seal upon full mold closure;

b. a recessed receiving surface on the horizontal edge of said secondary mold member for receiving sad sealing portion of saidstrip; and, c. means for mounting said strip to said first mold member.

4. A pressure seal, as described in claim 3, wherein said strip comprises a thin foil of spring-type metal and wherein said rigid-deflectable portion slidable engages a stop on the horizontal surface of said first mold member, the free end of said rigid-deflectable portion being restrained from lateral movement away from said stop by reverse spring tension applied thereto by the curvature of said strip, whereby said rigid-deflectable portion slides toward and bottoms on said first mold member upon final mold closure.

5. A pressure seal, as described in claim 3, wherein said strip of material comprises a flexible, spring-type laminate having at least one layer of flexible polymeric material interposed and bonded to two higher modulus cover layers and wherein said rigid-deflectable portion includes a substantially flat face for engagement with a substantially parallel-faced stop on said second mold member whereby during mold member closure the curvature of said strip is caused to straighten forcing said rigid-deflectable portion against said stop to provide secondary force for said seal upon final mold closure.

6. A pressure seal, as described in claim 2 wherein said rigid-deflectable portion between said edge portion and said curved sealing portion extends substantially parallel to the axis of mold member travel.

7. A pressure seal, as described in claim 2 wherein said recessed receiving surface on said second mold member comprises a smooth-surfaced, round-bottom groove positioned opposite said curved sealing portion and along the entire length of said strip, said groove having a width substantially equal to the curvature of said curved portion that engages said receiving surface and having a depth at least equal to the radius of curvature of said curved portion.

8. A pressure seal, as described in claim 2 wherein said curved sealing portion defines a single incomplete reverse-curve beginning near the inner edge of said mold cavity and extending outward therefrom.

9. A pressure seal, as described in claim 3 wherein said rigid-deflectable portion extends from said sealing portion in a direction substantially parallel to the axis of mold member travel.

10. A pressure seal, as described in claim 4, wherein said stop on said first mold member comprises a raised step on said first mold member.

11. A pressure seal, as described in claim 3 wherein the curved portion of said strip defines a double-reverse curve wherein the curve adjacent said mounted edge portion of said strip is concave in the direction of said first mold member.

12. A pressure seal, as described in claim 4 wherein said recessed receiving surface on said second mold member comprises a smooth surface defining a curvature corresponding at least in part to the curvature of said curved portion of said sealing portion.

13. A pressure seal, as described in claim 5 wherein the plane of said flat face of said rigid-deflectable portion is substantially parallel to the axis of mold member travel.

14. A pressure seal, as described in claim 5 wherein said curvature defines an "offset" type curve that extends outward from the edge of said first mold member and curves toward said second mold member and then curves outward again from the edge of said first mold member.

15. A pressure seal, as described in claim 5 wherein said stop on said second mold member comprises a raised step on said second mold member.

PO-1050
(5/69)

UNITED STATES PATENT OFFICE
CERTIFICATE OF CORRECTION

Patent No. 3,601,856     Dated    August 31, 1971

Inventor(s)  Harris-Hartz-Rossomme

It is certified that error appears in the above-identified patent and that said Letters Patent are hereby corrected as shown below:

Column 2, line 17, the word "extend" should read --extent--.
Column 2, line 36, the phrase "to from a" should read --to form a--.
Column 2, line 49, the word "east" should read --easy--.
Column 4, line 6, the phrase "mole member 2," should read --mold member 2,--.
Column 5, line 40, the phrase "This is s" should read --this is a--.
Column 6, line 20, the phrase "of buckling" should read --or buckling--.
Column 6, line 27, the phrase "54 urges" should read --54 forces--.
Column 6, line 30, the phrase "sheet of foil" should read --sheet or foil--.
Column 6, line 35, the word "polyetrafluoroethylene" should read --polytetrafluoroethylene--.
Column 6, line 56, the phrase "portion 62 to" should read --portion 62 so--.
Column 7, lines 69-70, the phrase "having more having more than one" should read --having more than one--.
Column 8, line 3, the phrase "position for mold" should read --position upon mold--.
Column 8, line 24, the phrase "flexing this is" should read --flexing - this is--.
Column 8, line 50, the phrase "portion 96 shown" should read --portion 96 is shown--.
Column 9, line 39, the phrase "sad sealing" should read --said sealing--.
Column 9, line 44, the word "slidable" should read --slidably--.

Signed and sealed this 8th day of August 1972.

(SEAL)
Attest:

EDWARD M.FLETCHER,JR.
Attesting Officer

ROBERT GOTTSCHALK
Commissioner of Patents